United States Patent [19]

Tischer

[11] Patent Number: 5,086,863
[45] Date of Patent: Feb. 11, 1992

[54] ALL-WHEEL STEERING SYSTEM FOR MOTOR VEHICLES

[75] Inventor: Werner Tischer, Heubach-Lautern, Fed. Rep. of Germany

[73] Assignee: Zahnradfabrik Friedrichshafen, AG., Friedrichshafen, Fed. Rep. of Germany

[21] Appl. No.: 613,500

[22] PCT Filed: Jun. 10, 1989

[86] PCT No.: PCT/EP89/00653
§ 371 Date: Nov. 2, 1990
§ 102(e) Date: Nov. 2, 1990

[87] PCT Pub. No.: WO89/12568
PCT Pub. Date: Dec. 28, 1989

[30] Foreign Application Priority Data

Jun. 15, 1988 [DE] Fed. Rep. of Germany ....... 3820354

[51] Int. Cl.$^5$ .............................................. B62D 5/06
[52] U.S. Cl. ..................................... 180/140; 92/13.1; 92/13.6
[58] Field of Search ............... 180/140, 132; 91/508; 92/13.1, 13.6, 151

[56] References Cited

U.S. PATENT DOCUMENTS

| | | | |
|---|---|---|---|
| 4,669,567 | 6/1987 | Nakamura et al. | 280/91 |
| 4,781,262 | 11/1988 | Nakamura et al. | 280/91 |
| 4,798,256 | 1/1989 | Fassbender | 180/132 |
| 4,914,913 | 4/1990 | St. Germain et al. | 180/132 |

FOREIGN PATENT DOCUMENTS 67671 4/1986 Japan .................... 180/140

Primary Examiner—Charles A. Marmor
Assistant Examiner—Anne Marie Boehler
Attorney, Agent, or Firm—Albert M. Zalkind

[57] ABSTRACT

An all-wheel steering system for motor vehicles includes an adjusting motor (10) for the rear wheels. The motor has a piston rod on which two fixed working pistons (25 and 25A) and, in a housing segment located between the working pistons, two movable steering pistons (27 and 27A) are mounted. The working pistons (25 and 25A) and steering pistons (27 and 27A) form control chambers (28 and 28A) that are constantly connected to a pump (2). Between the steering pistons (27 and 27A) is a pressure chamber (33) in which a spring element (34) acts upon the steering pistons (27 and 27A). The pressure chamber (33) can be blocked via a 2/2-way valve (37) that is controlled by a switching device (17) or it can be connected with a tank (3). When the rear-wheel steering system (11) is in the operating position, the two steering pistons (27 and 27A) come to rest against a sleeve (35) on the piston rod by virtue of the pump pressure that is fed into the control chambers (28 and 28A). The piston rod (24) is then freely movable in both steering directions. In case of a pressure drop in the control chambers (28 and 28A) due to a disturbance in the hydraulic circuit, the 2/2-way valve is shifted and steering pistons (27 and 27A), by virtue of the force of the spring element (34), move against stops (36 and 36A). To delay the return motion, steering pistons (27 and 27A) push the hydraulic fluid located in the control chambers (28 and 28A) into the tank (3) via a diaphragm. This means that the rear-wheel steering system (11) is locked in the straight-forward running position.

7 Claims, 3 Drawing Sheets

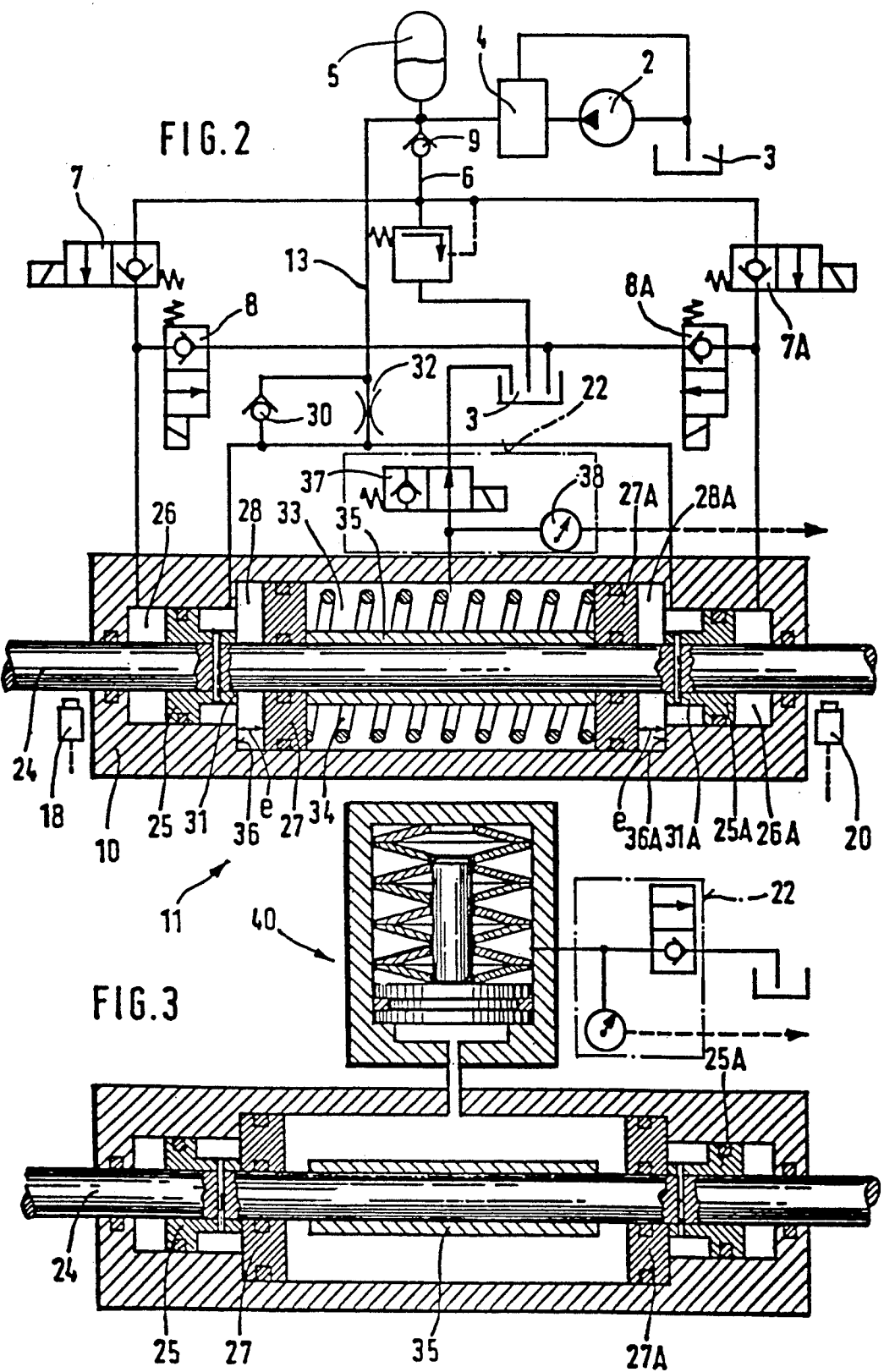

ABSTRACT# ALL-WHEEL STEERING SYSTEM FOR MOTOR VEHICLES

BACKGROUND OF THE INVENTION

This invention relates to a steering system for motor vehicles.

In such steering systems, the vehicle's rear wheels can be turned in the opposite direction with respect to the front wheels while the vehicle is moving slowly and in the same direction when the vehicle is moving fast. For this purpose, a steering valve is provided which activates both the front-axle steering and the rear axle steering. U S. Pat. No. 4,669,567 discloses an additional adjusting motor for the rear wheels which can be activated via a directional valve in accordance with the driving speed. In the extension of the housing of the working piston, the adjusting motor includes a housing segment with two steering pistons that act as stroke limitation pistons and that are spaced by a spring. The steering pistons can be shifted on a piston rod that simultaneously carries the working piston and comes to rest against the shoulders of the housing segment by virtue of the force of the spring. In the area of the steering pistons, the piston rod has a reduced diameter whose axial extent is larger, by a small amount, than the maximum interval between the two steering pistons. When the working piston is in the mid-point position, there are provided equally large intervals between sections of the piston rod into which the elastic forces are inserted. The spring chamber located between the two steering pistons functions as a pressure chamber and is connected to a pressure line of the pump. A branch of the pressure line leads to a tank. A throttle valve, that can be influenced by a driving speed sensor, is provided in the branch.

The known steering system is operated as follows. If the driver, in case of higher speed, performs a steering motion, then the driving speed sensor causes the throttle valve to close. A pressure is built up in the pressure chamber and that pressure holds the steering pistons so that they will rest against the shoulders of the housing segment. Simultaneously, the directional valve of the adjusting motor is switched due to the influence of yet another driving speed sensor so that the rear wheels will perform an equidirectional steering motion with the front wheels. Because both steering pistons are fixed axially, the piston rod can be shifted only in the area of small intervals, whereby the elastic bodies are compressed. This results in a steering angle deflection of the rear wheels amounting to about 8°. Driving stability is increased as a result of this steering process. If the driver, on the other hand, while driving slowly, performs a steering motion, then the driving speed sensor will open the throttle valve, whereby no pressure is generated in the pressure chamber. Only the spring forces the steering pistons against the housing shoulders. Simultaneously, the other driving speed sensor switches the directional valve into a position in which the rear wheels will be engaged so that they will be in a steering direction opposite to the front wheels. Depending on the steering direction, the piston rod steers one of the steering pistons against the force of the spring, away from its shoulder, as a result of which a considerably greater shifting distance for the piston rod and thus also a greater steering engagement for the rear wheels is provided. This arrangement is intended to facilitate stable steering behavior during fast driving speeds and a tight turning circle in case of slower driving speeds. In case of failure of the hydraulic system and because the piston rod is freely movable in the straight-ahead driving position, the rear wheels are inclined to a self-steering behavior pattern, especially when driving rapidly on an uneven road. This signifies an unfavorable change in the vehicle's driving behavior because uncontrolled wheel-turning and axle-shimmying will impair directional and driving stability. Moreover, in the known steering system, when the vehicle is being driven slowly, high pressures are required because one must overcome not only the friction force of the wheels to be steered but, simultaneously, also the force of the spring acting upon the steering pistons.

SUMMARY OF THE INVENTION

Accordingly, it is a primary object of the present invention to provide a means for returning the rear steering axle if there is trouble in the hydraulic system or in the electronic control part of the steering system to the straight-ahead running position and to arrest it there. In the process, the return motion is to take place without the occurrence of surprising steering effects. The arresting function should be capable of reliably absorbing the forces acting upon the wheels so that no axle position changes and shimmying motions of the wheels will occur.

In accordance with the invention, steering pistons are provided in the housing segment of the adjusting motor which define control chambers on their end facing away from the pressure chamber with working pistons that are arranged on far sides of the control chambers and that are fixed on the piston rod. When the steering system is in an operational readiness state, the pressure in these control chambers keeps the pistons resting against a sleeve, against the force of a spring element arranged in the pressure chamber. The pressure chamber can be relieved via an electronically controllable 2/2-way valve. A pressure monitor checks on the pressure buildup in the pressure chamber and can selectively transmit a release signal to a switching instrument that is connected with the 2/2-way valve.

When in the relief position, the steering pistons are spaced with respect to the shoulders in the housing and to the stop collars that are provided on the working pistons. In case of a steering motion, one of the pressure chambers of the working piston is activated via a valve device, thereby causing the rear wheels to move by a kick-in angle, for the purpose of driving along a curved line, for example. If, as a result of a disturbance in the hydraulic circuit, there is a pressure drop in the control chambers, then the steering pistons will make contact with the shoulders and the working pistons due to the action of the spring, thereby causing the return and arrest of the piston rod while the rear wheels are in the straight-ahead running position. The oil, which is displaced out of the control chambers during the return motion of the steering pistons, flows out via an orifice that works as a brake. As a result of the gradual return motion, a steering effect that would suddenly take the driver by surprise is prevented. The arresting position according to the invention represents a considerable improvement in the operational safety of an all-wheel steering system in case of hydraulic trouble. The return and arresting device does not require any additional energy expenditure during steering.

Another object of the invention is to provide a rapid cutoff that acts upon the arresting device in case of failure of the electric portion of the steering system. For this purpose, there is provided a cutoff line with a blocking valve that is connected with the pressure chamber and the pressure source. Switchover valves are built into the line segments that are connected to the control chambers and are also linked to the pressure source. If there is a disturbance in the electronic portion of the steering system, then the blocking valve will switch into the through-passage position and the two switchover valves will switch into the relief position. Simultaneously, the 2/2-way valve of the control device is also switched around and high system pressure is built up in the pressure chamber without delay so that the steering pistons will immediately move into the arresting position, thereby preserving steering safety. The effects upon driving stability are immaterial because the rapid cutoff takes effect only when the vehicle is stationary or when it is running at slow speed.

BRIEF DESCRIPTION OF THE FIGURES

Further objects and advantages of the invention will become apparent from a study of the following specification when viewed in the light of the accompanying drawings in which:

FIG. 1 is a diagram illustrating an all-wheel steering system;

DETAILED DESCRIPTION

Figure 2:
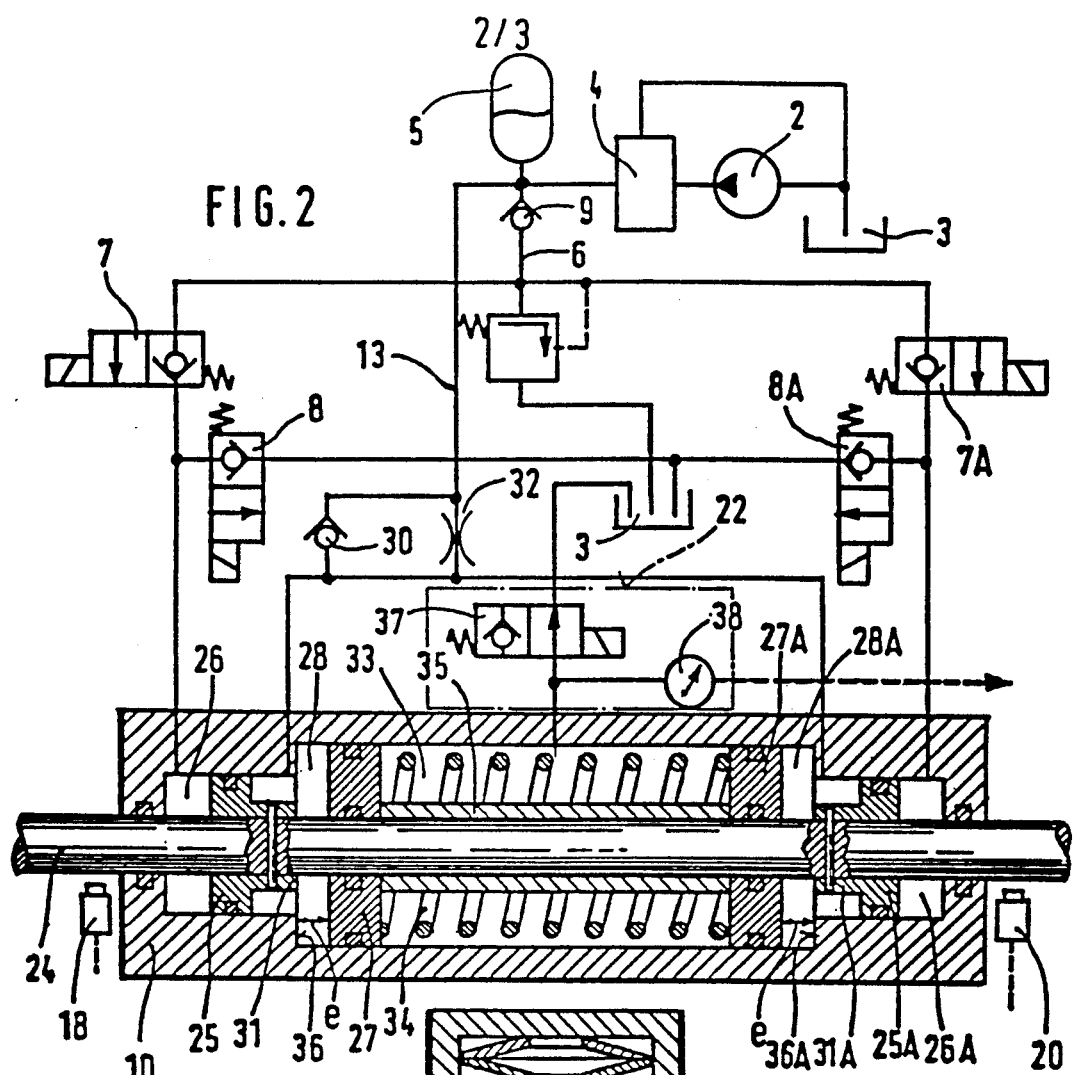
FIG. 2 is a diagram illustrating the rear-axle steering system of FIG. 1.

The general drawing according to FIG. 1 shows a front-wheel steering system 1 that can be activated mechanically or servohydraulically. For the sake of simplicity, the hydraulic lines necessary for auxiliary power steering have been omitted. A drive motor (not shown) drives a high-pressure pump 2 that supplies pressure oil to the rear steering system 11, and to the front-wheel steering 1 as needed. Pump 2 draws the oil out a reservoir 3 and fills an accumulator 5 via an accumulator charging valve 4. Accumulator 5 insures that adequate pressure energy will be available under all operating conditions. A feeder line 6, containing a nonreturn valve 9, is connected via a valve device in the form of solenoid valves 7 and 7A, with an adjusting motor 10 of the rear-wheel steering system 11. Additional solenoid valve 8 and 8A connect the pressureless side of the adjusting motor 10 with reservoir 3. A pressure limiting valve 12 adjusts the maximum pressure in the hydraulic circuit. A line branch 13 of the feeder line 6 leads to a return and arresting device in adjusting motor 10. On a steering-wheel shaft of the front-wheel steering subsystem, there is a steering angle sensor 15 which is connected with an electronic switching device 17 via a control line. Adjacent the adjusting motor 10 of the rear-wheel steering subsystem 11, there are attached corresponding path sensors 18 and 20 which have control lines leading to the switching device 17. A tachometer 21 feeds a speed signal into the switching device 17 which processes the signal and, in the known manner, transmits output signals to solenoid valves 7, 7A and 8, 8A. The rear wheels can be turned in accordance with a turn of the front-wheel steering subsystem either in the same direction or in the opposite direction with respect to the front wheels depending on the driving speed.

In accordance with the invention, a control device 22 is connected with the switching device 17 via a control line as will be discussed below.

In FIG. 2, the structural components that were described in connection with FIG. 1 have the same reference symbols. Adjusting motor 10 includes a piston rod 24 that is connected with track rods 23 and 23A (FIG. 1) of the rear wheels. Working pistons 25 and 25A are fastened upon piston rod 24 and, together with the housing of adjusting motor 10, form pressure chambers 26 and 26A. These pressure chambers 26 and 26A can be connected via solenoid valves 7, 7A with feeder line 6. Also, associated with pressure chambers 26 and 26A are solenoid valves 8 or 8A which, depending on the turning direction of the rear-wheel steering subsystem 11, have a relieving function. Switching device 17 (FIG. 1) always switches the solenoid valves 7 and 8A or 7A and 8 in pairs.

A housing segment with a larger inside diameter than the cylinder segments of the working pistons 25 and 25A contains two steering pistons 27 and 27A that can be shifted on piston rod 24. According to the invention, working pistons 25 and 25A and steering pistons 27 and 27A define control chambers 28 and 28A between themselves. These control chambers are connected to line branch 13 that leads to the pressure source that consists of pump 2, storage tank charging valve 4, and storage tank 5. Line branch 13 contains a nonreturn valve 30 that opens in the direction of the control chambers 28 and 28A. A restricted orifice 32 sits in a line segment that serves as a return line and that goes around nonreturn valve 30. When the steering system is in the operational readiness state, steering pistons 27 and 27A are braced on a sleeve 35 against the force of a spring element 34. A pressure chamber 33 encloses spring element 34 and sleeve 35. If there is a disturbance in the hydraulic circuit, then steering pistons 27 and 27A come to rest against shoulders 36 and 36A of the housing, and at the same time they come to rest against the stop collars 31 or 31A of working pistons 25 and 25A.

Control mechanism 22, which influences pressure chamber 33, consists of an electromagnetically activatable 2/2-way valve 37 with a through-passage position and a blocking position in the direction of the tank. A pressure monitor 38 is provided which monitors the pressure in pressure chamber 33 and which is connected with switching device 17 via an electrical control line.

The rear-wheel steering subsystem works in the following manner:

FIG. 2 shows the starting position with the vehicle engine running and the pump 2 in operation. Via line branch 13, a pressure builds up in control chambers 28 and 28A and that pressure forces steering pistons 27 and 27A against casing 35. The 2/2-way valve is in its through-passage position. In this way, piston rod 24 is free and the system is ready for steering. If the driver performs a steering motion, for example, to the right, on the steering wheel of the front-wheel steering subsystem 1, then a corresponding input signal is fed into the switching device 17. As a function of this input signal and the signal of tachometer 21, switching device 17 for example, when the vehicle is being driven fast, activates the two solenoid valves 7A and 8 so that pressure chamber 26A is connected to the feeder line 6 and pressure chamber 26 is connected to tank 3. The stroke of piston rod 24 to the left is limited to the maximum shifting distance 2x e, whereby the return and arresting device 27, 27A, 34, and 35 in the block comes to rest upon shoulder 36. Switching device 17 controls the agreement of the steering angle with the front-wheel steering subsystem via the path sensors so that the device may perform a correction of the rear-wheel steering.

Assuming the pressure in the hydraulic circuit fails during the previously described steering process due to a failure of pump 2, then control chambers 28 and 28A will be without pressure. Spring element 34 can be released so that steering piston 27A (with piston rod 24 having been shifted to the left) comes to rest against the stop collar 31A of working piston 25A, and moves the piston into the mid-point position in which steering piston 27A rests against shoulder 36A. Simultaneously, stop collar 31 also comes to rest against steering piston 27 that is braced on shoulder 36. In the process, the nonreturn valve in 2/2-way valve 37 can continue to draw oil into the pressure chamber 33. This return of piston rod 24 into the straight-ahead running position takes place without delay because the oil, displaced from control chambers 28 and 28A, can flow back into reservoir 3 via shutter 32 only gradually. In this way, one can make sure that the driver will not be surprised by a sudden steering motion. The arresting function in the straight-ahead driving position can be retained by the force of spring element 34, closed 2/2-way valve 37, as well as the nonreturn valves in the solenoid valves 7, 7A and 8, 8A.

Figure 3:
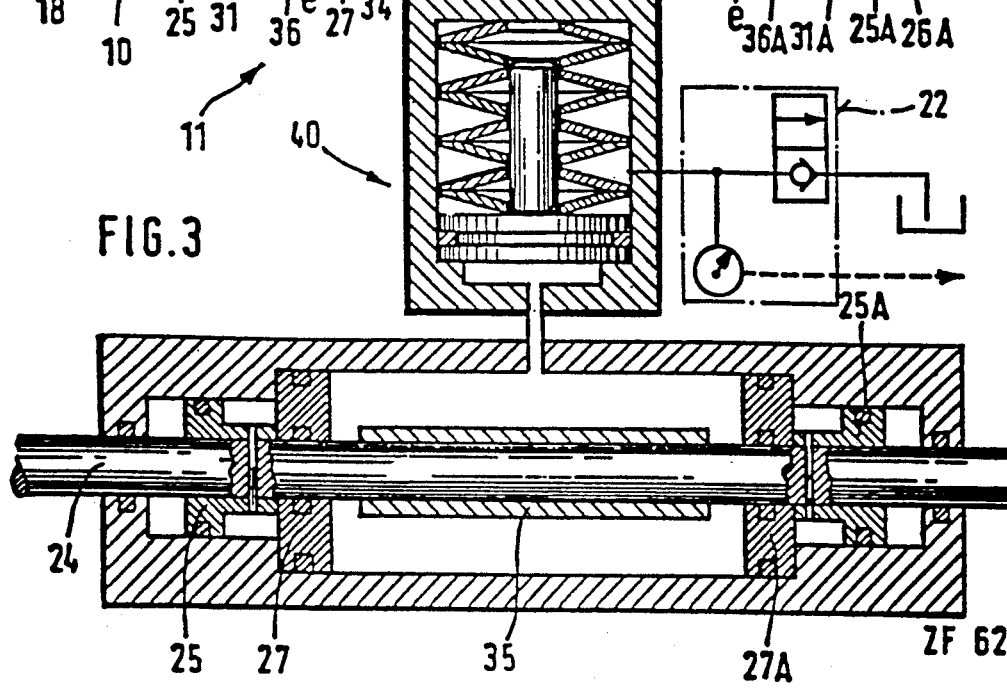
FIG. 3 is a partial sectional view of a first embodiment of the rear-axle steering system.

In the embodiment of FIG. 3, instead of spring element 34 that lies between steering pistons 27 and 27A and that is preferably made in the form of a cup spring package, a spring loader is provided 40 with the control device 22 described in FIG. 2. In contrast to FIG. 2, the return and arresting device 27, 27A, and 35 is in the blocking position. The line connections and valves not shown correspond to the illustration according to FIG. 2.

Figure 4:
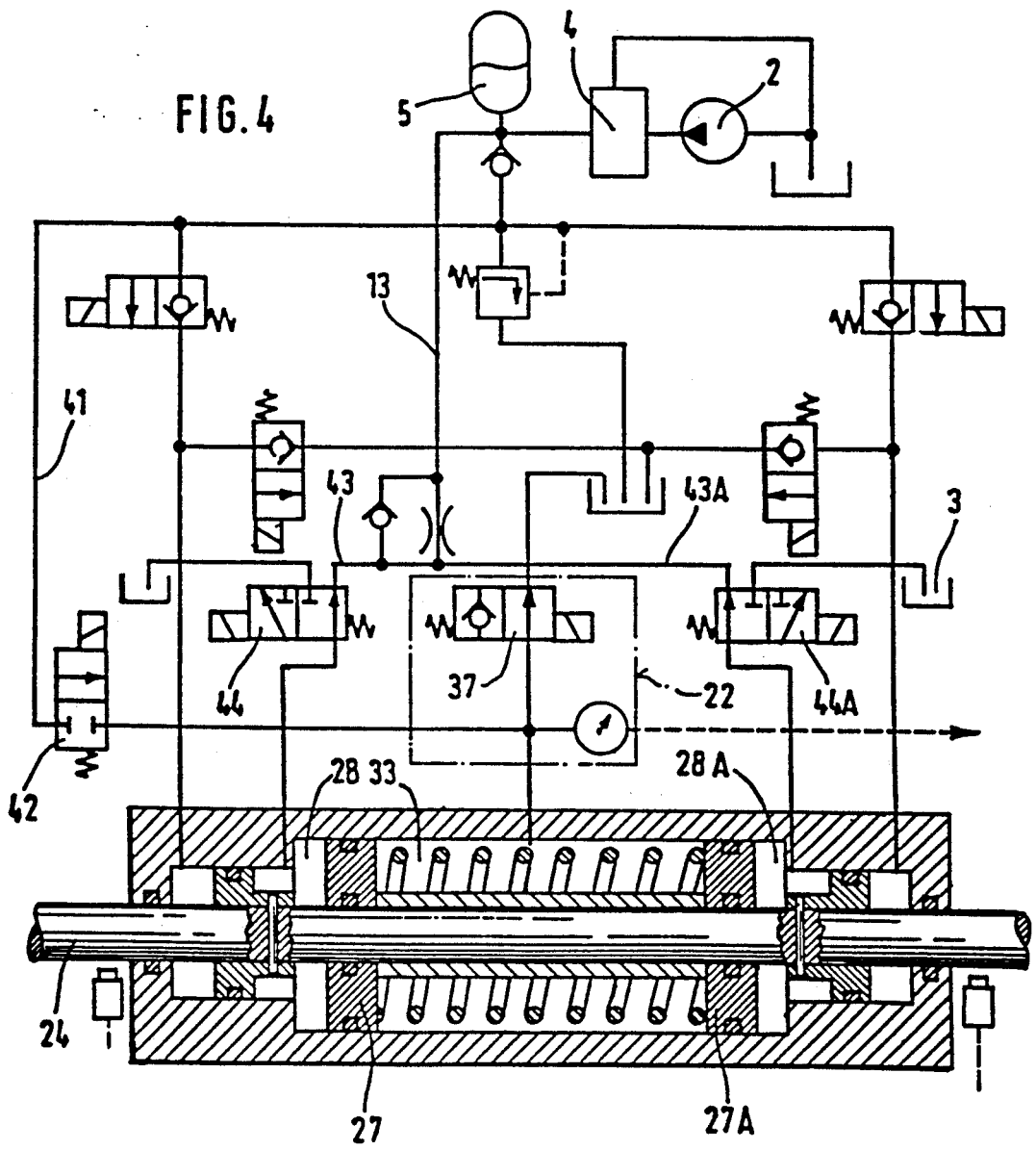
FIG. 4 is a partial sectional view of a preferred embodiment with a rapid safety cutoff.

The rear-wheel steering mechanism according to FIG. 2 can be further improved by the installation of a rapid cutoff that acts upon the arresting device 27, 27A, 34, and 35 in case of trouble in the electronic part of the steering system. The preferred embodiment according to FIG. 4 shows the structural components which are additionally required for rapid cutoff.

The feeder line 6 can be connected with pressure chamber 33 via a cutoff line 41. A blocking valve 42 with a blocking position and a through-passage position is provided in cut-off line 41. Furthermore, line segments 43 and 43A, connected with line branch 13 and leading to control chambers 28 and 28A, contain switchover valves 44 and 44A. These valves 42, 44, and 44A can be activated electromagnetically. Blocking valve 42 and switchover valves 44 and 44A are, as shown in the drawing, in a position where the rear-axle steering subsystem is ready for operation. In case of any trouble in the electronic part of the steering system, a safety circuit switches blocking valve 42 into the through-passage position and switchover valves 44 and 44A are switched in to the relief position. Simultaneously, 2/2-way valve 37 is switched into its blocking position. Because system pressure can now be built up in pressure chamber 33 via cutoff line 41 and because the oil volume, located in control chambers 28 and 28A, can be pushed out without delay, steering pistons 27 and 27A will immediately move into the arresting position.

If no safety circuit is provided in the electronic part of the steering system, then valves 42, 44 and 44A are arranged in a forced circuit. This means that the valves are energized in the steering operation position, and are moved into the fast cutoff position by the spring force in case of trouble.

I claim:

1. An all-wheel steering system for motor vehicles including a steering wheel for activating a first steering system (1) for steering front wheels of the vehicle, a second steering system (11) for steering rear wheels of the vehicle, the second steering system including an adjusting motor (10) activated by a control device (22) as a function of the steering of the front wheels, the adjusting motor including working pistons (25, 25A) mounted on a piston rod (24) for providing steering movement to the vehicle rear wheels, the adjusting motor further including two steering pistons (27, 27A) positioned on the piston rod and defining a pressure chamber (33) therebetween having a variable volume in accordance with the position of the steering pistons, the pressure chamber being connected with the control device, the adjusting motor further including stops (36, 36A) for bracing the steering pistons and a spring mechanism (34, 40) for biasing the steering pistons, the improvement wherein,
(a) the adjusting motor includes control chambers (28, 28A) defined by the steering pistons on opposite sides of the pressure chamber, the working pistons being arranged in said control chambers;
(b) the working pistons are supported by the steering pistons when the steering pistons abut against the stops; and
(c) the control device includes
 (1) a 2/2-way valve (37) having a through flow position for relieving the pressure chamber and a blocking position for retaining pressure in the pressure chamber; and
 (2) a pressure monitor (38) connecting with an electronic switching device for monitoring pressure increases in the pressure chamber.

2. A steering system as defined in claim 1, wherein the control chambers are connected with a fluid pressure source (2, 4, 5).

3. A steering system as defined in claim 1, wherein a return line (13) is provided between the control chambers and a feeder line (6), the return line containing a diaphragm (32) and the feeder line containing a nonreturn valve (30) parallel to said diaphragm.

4. A steering system as defined in claim 1, wherein the steering pistons abut against a sleeve (35) about the piston rod when in a steering position.

5. A steering system as defined in claim 1, wherein the spring mechanism comprises a cup spring (34).

6. A steering system as defined in claim 1, wherein the spring mechanism comprises a spring loader (40) connected with the pressure chamber.

7. A steering system as defined in claim 3, and further comprising
(a) a cutoff line (41) between said feeder line and the pressure chamber (33), said cutoff line containing a blocking valve (42) having blocking and flow-through positions; and
(b) line segments (43, 43A) between said return line and the control chambers, said line segments each containing switchover valves having flow-through and relief positions, said blocking valve being switched to its flow-through position and said switching valves being switched to their relief positions in response to a disturbance in the electronic switching device.

* * * * *